(12) United States Patent
Earl (10) Patent No.: US 9,635,103 B2
(45) Date of Patent: Apr. 25, 2017

(54) DYNAMIC VIRTUAL RESOURCE REQUEST RATE CONTROL FOR UTILIZING PHYSICAL RESOURCES

(71) Applicant: Amazon Technologies, Inc., Reno, NV (US)

(72) Inventor: William John Earl, Burien, WA (US)

(73) Assignee: Amazon Technologies, Inc., Reno, NV (US)

( * ) Notice: Subject to any disclaimer, the term of this patent is extended or adjusted under 35 U.S.C. 154(b) by 197 days.

(21) Appl. No.: 14/483,952

(22) Filed: Sep. 11, 2014

(65) Prior Publication Data
US 2016/0080484 A1 Mar. 17, 2016

(51) Int. Cl.
| | | |
|---|---|---|
| *G06F 15/173* | (2006.01) | |
| *H04L 29/08* | (2006.01) | |
| *G06F 9/50* | (2006.01) | |

(52) U.S. Cl.
CPC ........ *H04L 67/1031* (2013.01); *G06F 9/5016* (2013.01); *H04L 67/1008* (2013.01); *G06F 2209/5013* (2013.01); *G06F 2209/5019* (2013.01)

(58) Field of Classification Search
USPC ................................. 709/226, 219, 202, 213
See application file for complete search history.

(56) References Cited

U.S. PATENT DOCUMENTS

| | | | |
|---|---|---|---|
| 7,356,817 B1 | 4/2008 | Cota-Robles et al. | |
| 7,797,699 B2 | 9/2010 | Kagi et al. | |
| 8,161,491 B2 | 4/2012 | Krishnakumar et al. | |
| 8,397,236 B2 | 3/2013 | Gibson | |
| 8,533,728 B2 | 9/2013 | Amin | |
| 8,549,524 B2 | 10/2013 | Jula | |
| 8,683,467 B2 | 3/2014 | Bingham et al. | |

FOREIGN PATENT DOCUMENTS

| | | |
|---|---|---|
| EP | 2637097 | 9/2013 |
| WO | 01/31861 | 5/2001 |

OTHER PUBLICATIONS

Diego Ongaro, et al., "Scheduling I/O in Virtual Machine Monitors", VEE'08, Mar. 5-7, 2008, pp. 1-10, Seattle, Washington, USA.
International Search Report and Written Opinion from PCT/US2015/049587, Date of mailing Dec. 14, 2015, Amazon Technologies, Inc., pp. 1-14.

*Primary Examiner* — Lan-Dai T Truong
(74) *Attorney, Agent, or Firm* — Robert C. Kowert; Meyertons Hood, Kivlin, Kowert & Goetzel, P.C.

(57) ABSTRACT

A virtualization host may implement dynamic virtual resource request rate controls for physical resources. Individual virtual resource request queues may be maintained for different virtual compute instances implemented at a virtualization host for a particular physical computer resource. After placing a work request from one of the individual virtual resource request queues into a physical resource request queue to be performed at the physical computer resource, a delay may be dynamically determined based, at least in part, on the workload of the physical resource request queue. After imposing the delay, a next work request from the individual virtual resource request queue may be placed into the physical resource request queue. In at least some embodiments, the dynamically determined delay may include a randomly added delay.

20 Claims, 7 Drawing Sheets

DYNAMIC VIRTUAL RESOURCE REQUEST RATE CONTROL FOR UTILIZING PHYSICAL RESOURCES

BACKGROUND

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Virtualization technologies may be leveraged to create many different types of services or perform different functions for client systems or devices. For example, virtual machines may be used to implement a network-based service for external customers, such as an e-commerce platform. Virtual machines may also be used to implement a service or tool for internal customers, such as an information technology (IT) service implemented as part of an internal network for a corporation. Utilizing these virtual resources efficiently, however, may require flexible utilization options for many different types of virtual resource workloads. In some environments multiple virtual machines may be hosted together on a single host, creating the possibility for contention and conflicts when utilizing different virtual computing resources that may rely upon the same physical computer resources.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement variable timeslices for latency-dependent workloads at a virtualization host, according to some embodiments. Virtualization hosts may provide virtualized devices or resources as part of implementing virtual compute instances. These virtualized devices may provide a virtual compute instance with access to an underlying physical resource corresponding to the virtual resource. For example, a virtual central processing unit (vCPU) may be implemented for a compute instance, which can in turn be utilized to access a physical central processing unit (CPU). Work requests may be submitted to individual virtual resource queues, which may correspond to a particular compute instance, from which they are then placed into a common physical resource queue for the physical computer resource performing the work request. Multiple different physical computer resources may have different resource request queues and corresponding individual virtual resource requests queues for compute instances that utilize the different physical computer resources.

As differing virtual compute instances may perform different tasks or functions, the utilization of underlying physical computer resources may differ as well. Some instance workloads may be throughput sensitive, submitting a high-volume of work requests to utilize physical computer resources, in various embodiments. Other instance workloads may be latency sensitive, submitting smaller numbers of work requests to utilize physical computer resources that may be dependent upon a response from the physical computer resources to continue performing, such as sending out requests via a network and receiving responses via the network. Often times, the smaller number of latency sensitive work requests may be blocked or forced to wait behind large numbers of work requests submitted by a throughput sensitive instance workloads, increasing latency for the latency sensitive work requests (e.g., if the work requests are processed as they are received for the underlying physical computer resource, then instances that submit a large number of requests may force an instance that submits a single request to wait until the larger number of requests have been performed). In various embodiments, dynamic virtual resource request rate controls for physical computer resources may be implemented to provide statistical fair-sharing among different virtual compute instances utilizing the same physical computer resource, without maintaining large in-memory data structures for scheduling or ordering work requests for submission to the physical resource request queue. Moreover, dynamic virtual resource request rate controls may provide consistent performance for performing individual work requests, so that a physical resource request queue for an underlying physical computer resource may not be overloaded with work requests.

Figure 1:
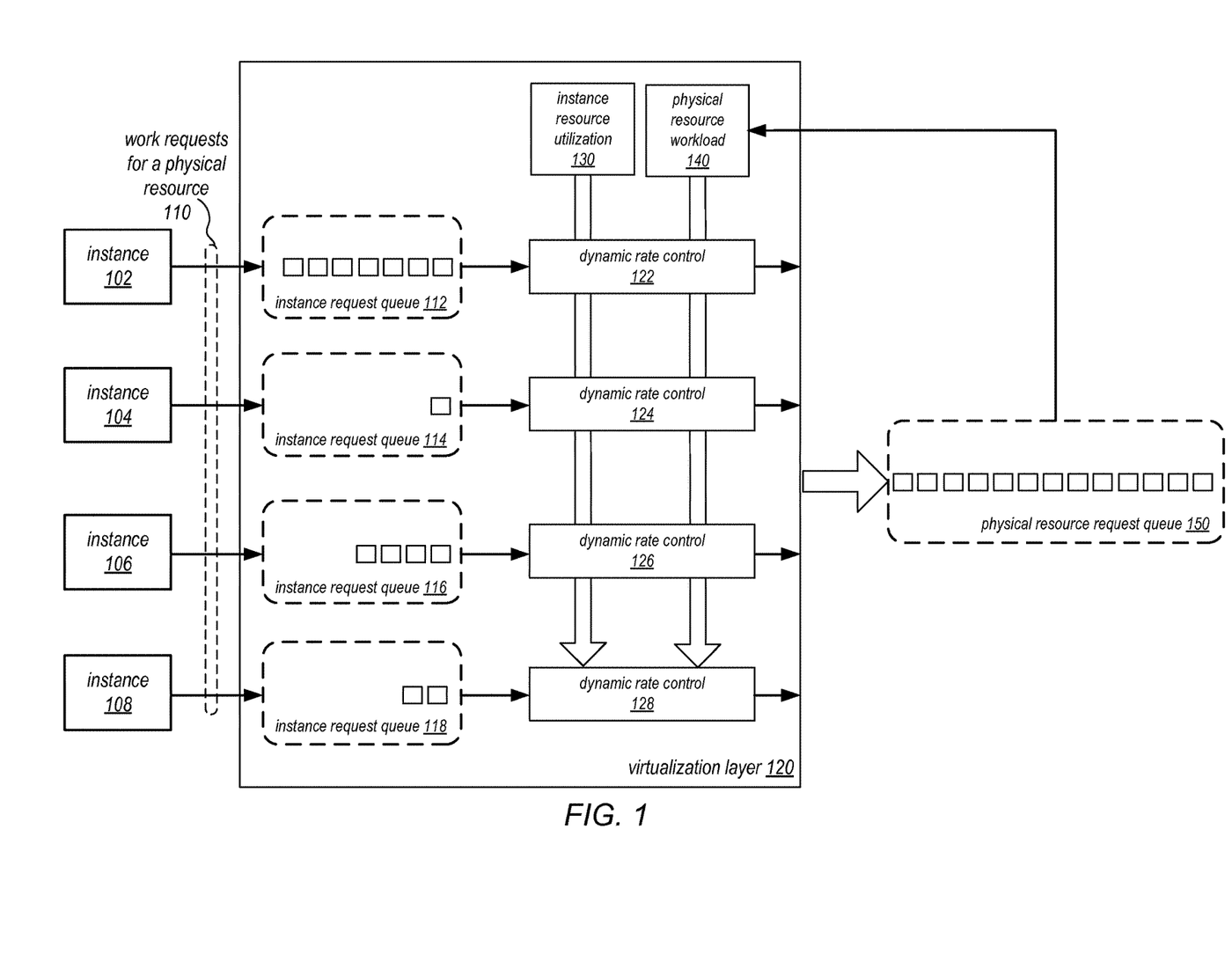
FIG. 1 is a block diagram illustrating a dynamic virtual resource request rate control for physical resources, according to some embodiments.

FIG. 1 is a block diagram illustrating a dynamic virtual resource request rate control for physical resources, according to some embodiments. A virtualization host, such as virtualization hosts 234 and 310 described below with regard to FIGS. 2 and 3 may implement multiple virtual compute instances, such as virtual compute instances 102, 104, 106 and 108. Virtual compute instances may utilize virtual devices or other interfaces which may submit work requests 110 for a physical resource to an individual instance request queue for that resource, such as instance request queues 112, 114, 116, and 118. Dynamic rate controls 122, 124, 126, and 128 may place work requests from instance request queues into physical resource request queue 150 in order to ultimately be removed from physical resource request queue 150 and performed by the underlying physical computer resource.

Figure 6:
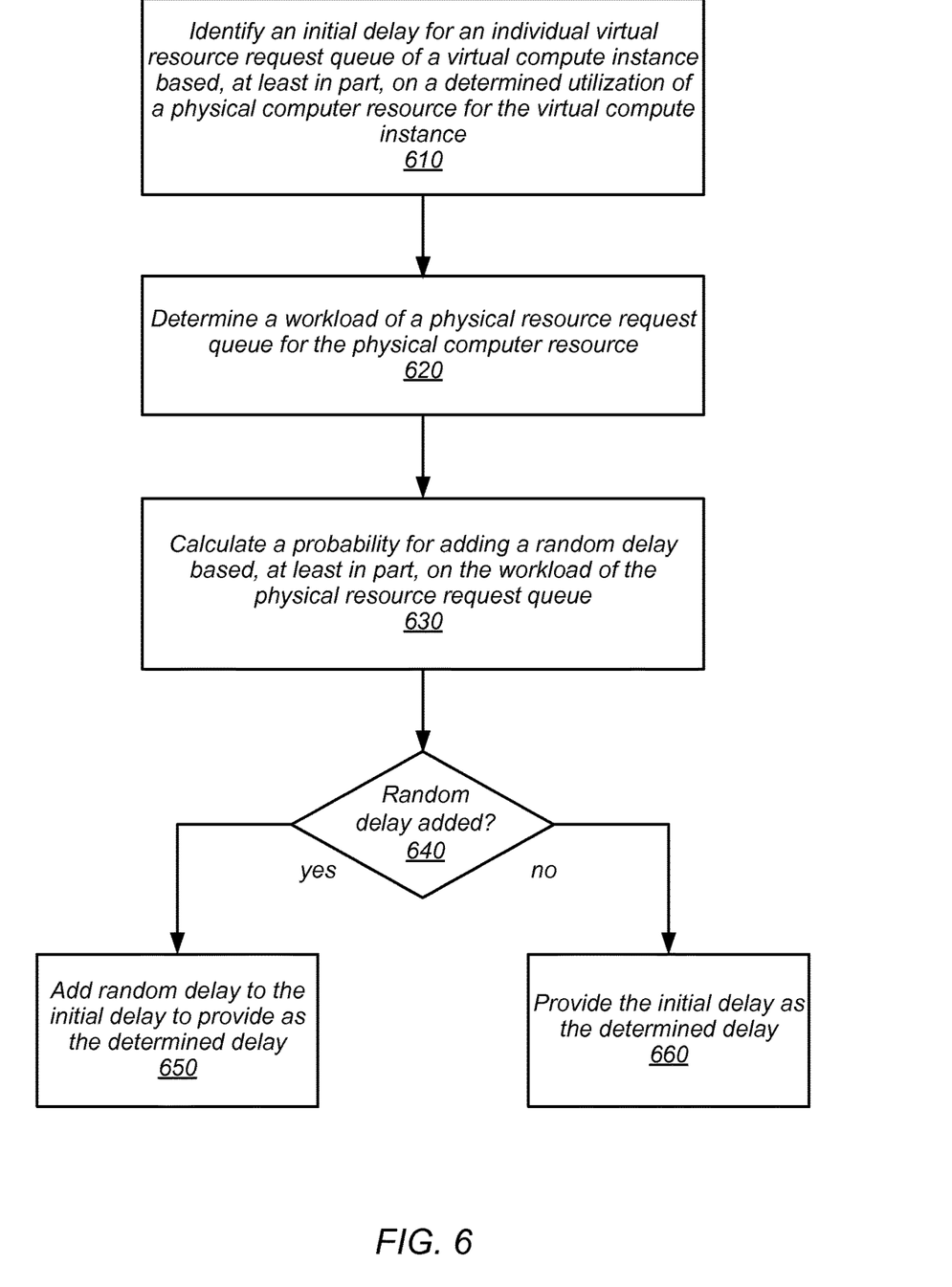
FIG. 6 is high-level flowchart illustrating various methods and techniques for determining a delay for a dynamic resource rate control, according to some embodiments.

Dynamic rate controls may, in various embodiments, impose delays between placing work requests from an instance request queue into physical resource request queue 150. Delays between work requests may be dynamically determined based on the workload of physical resource request queue 150 (e.g., based on the number of work requests in physical resource request queue 150). For example, workload metrics indicating the number of requests in queue 150 at particular points in time may be reported back (as illustrated by the loop back from queue 150) to physical resource workload module 140 which may determine a workload value or indicator, in some embodiments. The workload value or indicator may be provided (synchronously or asynchronously) to dynamic rate controls 122, 124, 126, and 128 for determining the delay between requests. In at least some embodiments, a random delay may be determined between work requests. The random delay may be added to an initial or baseline delay, in some embodiments, based on a probability determined using the workload value or indicator. Introducing random delays may prevent congestion in physical resource request queue 150 due to synchronized submissions of work requests (e.g., troops marching in time problem). FIG. 6, discussed below, provides further examples of adding random delays as part of dynamically determining a delay between work requests.

In various embodiments, a delay may be determined for each instance request queue according to the utilization of the underlying physical resource allotted to the instance. For example, instance resource utilization 130 may provide indicators of the allocated, purchased, or otherwise assigned utilization of the underlying physical computer resource to dynamic rate controls 122, 124, 126, and 128, which may identify an initial delay to provide in between work requests. The delay based on utilization may be provided between work requests, in some embodiments, whether or not a random delay is added to the delay. The delay for an instance request queue may be dynamic (changing between individual work requests or multiple work requests), as utilization allotted to a virtual compute instance may change. For example, in some embodiments, resource credit balances may be used to determine utilization of physical computer resources, as discussed below with regard to FIGS. 2-4. As a resource credit balance is depleted, utilization of the physical computer resource may decrease. Delays determined based on instance resource utilization may allow for sharing of the underlying physical computer resource for different instances, even those instances with different types of workloads (e.g., latency sensitive vs. throughput sensitive), such that an instance with higher or lower utilization than another instance may have work requests submitted during the delay of the other instance. Initial delays may be identified so that the number work requests in-flight or placed in physical resource request queue 150 does not exceed the allotted utilization.

Delays between work requests may also be determined to ensure that work requests are not forced to wait out of proportion with respect to the number of requests in a respective instance request queue. For example, instance request queues 112 and 116 have more work requests to submit than instance request queues 114 and 118. Delays between work requests may be determined so that work requests from for an instance with fewer work requests may be submitted during the delay between requests of an instance with a greater number of work requests queued. For example, after submitting a first work request, dynamic rate control 122 may delay another work request from instance request queue 112 for an amount of time so that a work request from instance request queue 114, a work request from instance request queue 116, and a work request from instance request queue 118 may be submitted.

Imposing dynamic delays between work requests from individual instance request queues based, at least in part, on workload of physical resource request queue 150 may reduce or eliminate congestion at physical resource request queue 150. As the workload of physical resource request queue 150 increases, more delays may be added or increased between work request submissions, throttling back the number of work requests placed in physical resource request queue 150. Similarly, if the workload of physical resource request queue 150 decreases, less delays may be added or delays may be decreased between work request submissions, increasing the number of work requests placed in physical resource request queue 150.

Please note that previous descriptions are not intended to be limiting, but are merely provided as an example of providing dynamic virtual resource request rate control for physical resources. The number and/or arrangement of different components, modules, or requests may all be different. Multiple physical computer resources, as illustrated below in FIG. 4, may be implemented, in a least some embodiments.

This specification next includes a general description of a provider network, which may implement dynamic virtual resource request rate controls for physical resources. Then various examples of a provider network are discussed, including different components/modules, or arrangements of components/module that may be employed as part of the provider network. A number of different methods and techniques to implement dynamic virtual resource request rate controls for physical resources at a virtualization host are then discussed, some of which are illustrated in accompanying flowcharts. Finally, a description of an example computing system upon which the various components, modules, systems, devices, and/or nodes may be implemented is provided. Various examples are provided throughout the specification.

Different clients implementing virtual computing resources have different resource demands. For example, some clients' workloads are not predictable and may not utilize fixed resources efficiently. Virtual compute instances implementing resource credits for scheduling virtual computing resources may provide dynamic utilization of resources to provide flexible high performance, without wasting unutilized fixed resources. Resource credits may be accumulated for individual virtual compute instances and maintained as part of an individual resource credit balance. When a virtual compute instance needs to perform work at high performance, the resource credits may be applied to the work, effectively providing full utilization of underlying physical resources for the duration of the resource credits. When a virtual compute instance is using less than its share of resources (e.g., little or no work is being performed), credits may be accumulated and used for a subsequent task. Resources may, in various embodiments, be any virtualized computer resource that is implemented or performed by a managed physical computer resource, including, but not limited to, processing resources, communication or networking resources, and storage resources.

Figure 2:
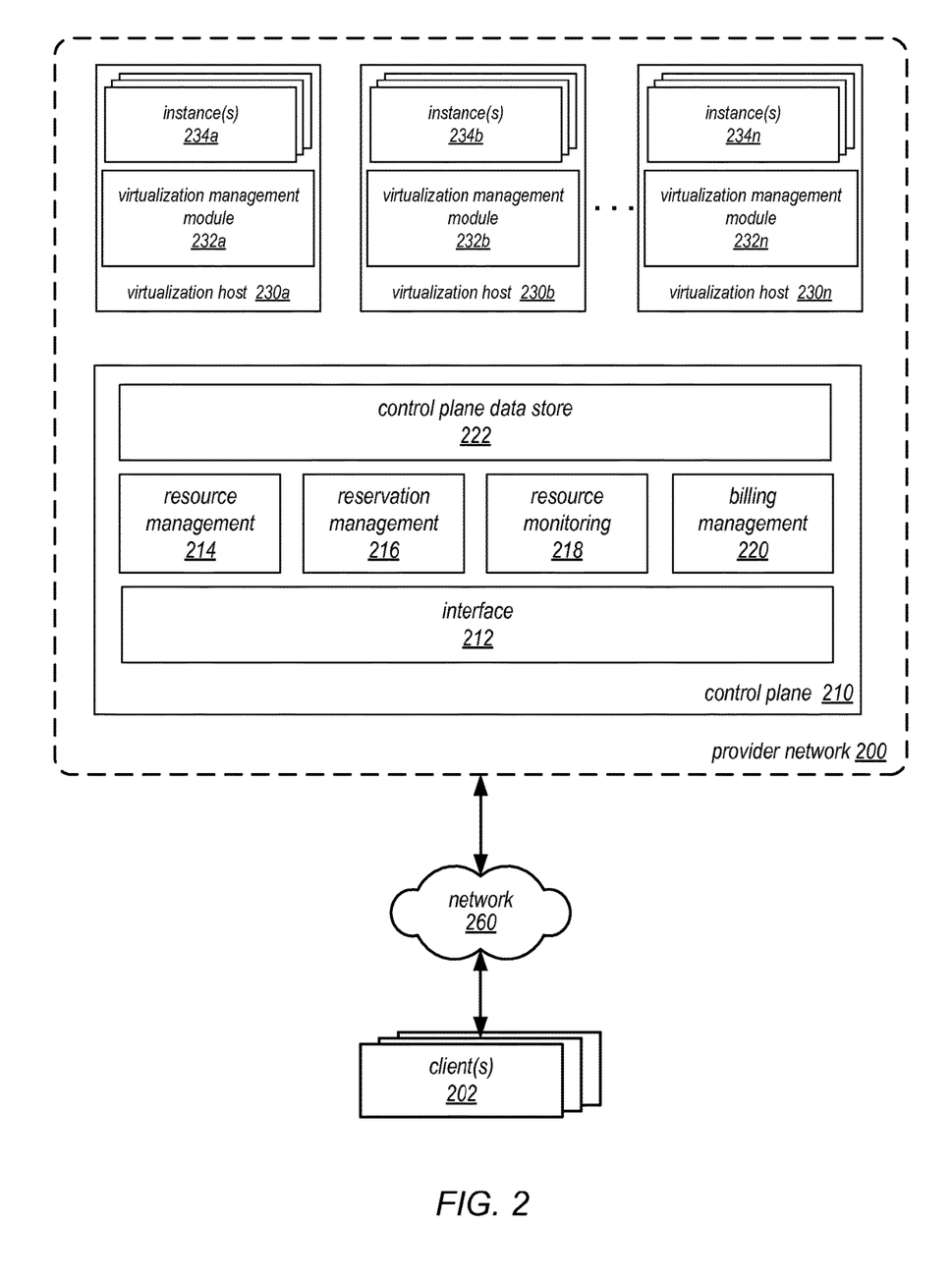
FIG. 2 is a block diagram illustrating a provider network that provides virtual compute instances for which dynamic virtual resource request rate controls are implemented, according to some embodiments.

FIG. 2 is a block diagram illustrating a provider network that provides virtual compute instances for which variable timeslices for processing latency-dependent workloads are implemented, according to some embodiments. Provider network 200 may be set up by an entity such as a company or a public sector organization to provide one or more services (such as various types of cloud-based computing or storage) accessible via the Internet and/or other networks to clients 202. Provider network 200 may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may provide computing resources. These computing resources may in some embodiments be offered to clients in units called "instances," 234 such as virtual compute instances.

In various embodiments, provider network 200 may implement a control plane 210 in order to manage the computing resource offerings provided to clients 202 by provider network 200. Control plane 210 may implement various different components to manage the computing resource offerings. Control plane 210 may be implemented across a variety of servers, nodes, or other computing systems or devices (such as computing system 1000 described below with regard to FIG. 7). It is noted that where one or more instances of a given component may exist, reference to that component herein may be made in either the singular or the plural. However, usage of either form is not intended to preclude the other.

In at least some embodiments, control plane 210 may implement interface 212. Interface 212 may be configured to process incoming requests received via network 260 and direct them to the appropriate component for further processing. In at least some embodiments, interface 212 may be a network-based interface and may be implemented as a graphical interface (e.g., as part of an administration control panel or web site) and/or as a programmatic interface (e.g., handling various Application Programming Interface (API) commands). In various embodiments, interface 212 may be implemented as part of a front end module or component dispatching requests to the various other components, such as resource management 214, reservation management 216, resource monitoring 218, and billing 220. Clients 202 may, in various embodiments, may not directly provision, launch or configure resources but may send requests to control plane 210 such that the illustrated components (or other components, functions or services not illustrated) may perform the requested actions.

Control plane 210 may implement resource management module 214 to manage the access to, capacity of, mappings to, and other control or direction of computing resources offered by provider network. In at least some embodiments, resource management module 214 may provide both a direct sell and $3^{rd}$ party resell market for capacity reservations (e.g., reserved compute instances). For example, resource management module 214 may allow clients 202 via interface 212 to learn about, select, purchase access to, and/or reserve capacity for computing resources, either from an initial sale marketplace or a resale marketplace, via a web page or via an API. For example, resource management component may, via interface 212, provide listings of different available compute instance types, each with a different credit accumulation rate. Additionally, in some embodiments, resource management module 214 may be configured to offer credits for purchase (in addition to credits provided via the credit accumulation rate for an instance type) for a specified purchase amount or scheme (e.g., lump sum, additional periodic payments, etc.). For example, resource management module 214 may be configured to receive a credit purchase request (e.g., an API request) and credit the virtual instance balance with the purchased credits. Similarly, resource management module 214 may be configured to handle a request to increase a credit accumulation rate for a particular instance. Resource management 214 may also offer and/or implement a flexible set of resource reservation, control and access interfaces for clients 202 via interface 212. For example resource management module 214 may provide credentials or permissions to clients 202 such that compute instance control operations/interactions between clients and in-use computing resources may be performed.

In various embodiments, reservation management module 216 may be configured to handle the various pricing schemes of instances 234 (at least for the initial sale marketplace) in various embodiments. For example network-based virtual computing service 200 may support several different purchasing modes (which may also be referred to herein as reservation modes) in some embodiments: for example, term reservations (i.e. reserved compute instances), on-demand resource allocation, or spot-price-based resource allocation. Using the long-term reservation mode, a client may make a low, one-time, upfront payment for a compute instance or other computing resource, reserve it for a specified duration such as a one or three year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of compute instance or other computing resource, and if the client's maximum price exceeded a dynamic spot price determined at least in part by supply and demand, that type of resource would be provided to the client.

During periods when the supply of the requested resource type exceeded the demand, the spot price may become significantly lower than the price for on-demand mode. In some implementations, if the spot price increases beyond the maximum bid specified by a client, a resource allocation may be interrupted—i.e., a resource instance that was previously allocated to the client may be reclaimed by the resource management module 330 and may be allocated to some other client that is willing to pay a higher price. Resource capacity reservations may also update control plane data store 222 to reflect changes in ownership, client use, client accounts, or other resource information.

In various embodiments, control plane 210 may implement resource monitoring module 218. Resource monitoring module 218 may track the consumption of various computing instances, (e.g., resource credit balances, resource credit consumption) consumed for different virtual computer resources, clients, user accounts, and/or specific instances. In at least some embodiments, resource monitoring module 218 may implement various administrative actions to stop, heal, manage, or otherwise respond to various different scenarios in the fleet of virtualization hosts 230 and instances 234. Resource monitoring module 218 may also provide access to various metric data for client(s) 202 as well as manage client configured alarms.

In various embodiments, control plane 210 may implement billing management module 220. Billing management module 220 may be configured to detect billing events (e.g., specific dates, times, usages, requests for bill, or any other cause to generate a bill for a particular user account or payment account linked to user accounts). In response to detecting the billing event, billing management module may be configured to generate a bill for a user account or payment account linked to user accounts.

A virtual compute instance 234 may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances 234 of network-based virtual computing service 200 in different embodiments, including general purpose or special purpose computer servers, storage devices, network devices and the like. In some embodiments instance clients 202 or other any other user may be configured (and/or authorized) to direct network traffic to a compute instance 234.

Compute instances 234 may operate or implement a variety of different platforms, such as application server instances, Java™ virtual machines (JVMs), general purpose or special-purpose operating systems, platforms that support various interpreted or compiled programming languages such as Ruby, Perl, Python, C, C++ and the like, or high-performance computing platforms) suitable for performing client 202 applications, without for example requiring the client 202 to access an instance 234. There may be various different types of compute instances. In at least some embodiments, there may be compute instances that implement resource credit balances for scheduling virtual computer resource operations. This type of instance may perform based on resource credits, where resource credits represent time an instance can spend on a physical resource doing work (e.g., processing time on a physical CPU, time utilizing a network communication channel, etc.). The more resource credits an instance has for computer resources, the more time it may spend on the physical resources executing work (increasing performance). Resource credits may be provided at launch of an instance, and may be defined as utilization time (e.g., CPU time, such as CPU-minutes), which may represent the time an instance's virtual resources can spend on underlying physical resources performing a task.

In various embodiments, resource credits may represent time or utilization of resources in excess of a baseline utilization guarantee. For example, a compute instance may have a baseline utilization guarantee of 10% for a resource, and thus resource credits may increase the utilization for the resource above 10%. Even if no resource credits remain, utilization may still be granted to the compute instance at the 10% baseline. Credit consumption may only happen when the instance needs the physical resources to perform the work above the baseline performance. In some embodiments credits may be refreshed or accumulated to the resource credit balance whether or not a compute instance submits work requests that consume the baseline utilization guarantee of the resource.

Different types of compute instances implementing resource credits for scheduling computer resources may be offered. Different compute instances may have a particular number of virtual CPU cores, memory, cache, storage, networking, as well as any other performance characteristic. Configurations of compute instances may also include their location, in a particular data center, availability zone, geographic, location, etc. . . . and (in the case of reserved compute instances) reservation term length. Different compute instances may have different resource credit accumulation rates for different virtual resources, which may be a number of resource credits that accumulate to the current balance of resource credits maintained for a compute instance. For example, one type of compute instance may accumulate 6 credits per hour for one virtual computer resource, while another type of compute instance may accumulate 24 credits per hour for the same type of virtual computer resource, in some embodiments. In another example the resource credit accumulation rate for one resource (e.g., vCPU) may be different than the resource credit accumulation rate for a different virtual computer resource (e.g., networking channel) for the same virtual compute instance. In some embodiments, multiple different resource credit balances may be maintained for a virtual compute instance for the multiple different virtual computer resources used by the virtual compute instances. A baseline performance guarantee may also be implemented for each of the virtual computer resources, which may be different for each respective virtual computer resource, as well as for the different instance types.

Baseline performance guarantees may be included along with the resource credit accumulation rates, in some embodiments. Thus, in one example, an instance type may include a specific resource credit accumulation rate and guaranteed baseline performance for processing, and another specific resource credit accumulation rate and guaranteed baseline performance rate for networking channels. In this way, provider network 200 may offer many different types of instances with different combinations of resource credit accumulation rates and baseline guarantees for different virtual computer resources. These different configurations may be priced differently, according to the resource credit accumulation rates and baseline performance rates, in addition to the various physical and/or virtual capabilities. In some embodiments, a virtual compute instance may be reserved and/or utilized for an hourly price. While, a long-term reserved instance configuration may utilize a different pricing scheme, but still include the credit accumulation rates and baseline performance guarantees.

As illustrated in FIG. 2, a virtualization host 230, such as virtualization hosts 230a, 230b, through 230n, may implement and/or manage multiple compute instances 234, in some embodiments, and may be one or more computing devices, such as computing system 1000 described below with regard to FIG. 4. A virtualization host 230 may include a virtualization management module 232, such as virtualization management modules 232*a*, 232*b* through 232*n*, capable of instantiating and managing a number of different client-accessible virtual machines or compute instances 234. The virtualization management module 232 may include, for example, a hypervisor and an administrative instance of an operating system, which may be termed a "domain-zero" or "dom0" operating system in some implementations. The dom0 operating system may not be accessible by clients on whose behalf the compute instances 234 run, but may instead be responsible for various administrative or control-plane operations of the network provider, including handling the network traffic directed to or from the compute instances 234. Virtualization management module 232 may be configured to implement dynamic virtual resource request rate controls for physical resources utilized by different instances 234.

Client(s) 202 may encompass any type of client configurable to submit requests to provider network 200. For example, a given client 202 may include a suitable version of a web browser, or may include a plug-in module or other type of code module configured to execute as an extension to or within an execution environment provided by a web browser. Alternatively, a client 202 may encompass an application such as a dashboard application (or user interface thereof), a media application, an office application or any other application that may make use of compute instances 234 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 202 may be configured to generate network-based services requests according to a Representational State Transfer (REST)-style network-based services architecture, a document- or message-based network-based services architecture, or another suitable network-based services architecture. In some embodiments, a client 202 (e.g., a computational client) may be configured to provide access to a compute instance 234 in a manner that is transparent to applications implement on the client 202 utilizing computational resources provided by the compute instance 324.

Clients 202 may convey network-based services requests to network-based virtual computing service 200 via network 260. In various embodiments, network 260 may encompass any suitable combination of networking hardware and protocols necessary to establish network-based communications between clients 202 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 202 and network-based virtual computing service 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 202 and the Internet as well as between the Internet and provider network 200. It is noted that in some embodiments, clients 202 may communicate with provider network 200 using a private network rather than the public Internet.

Figure 3:
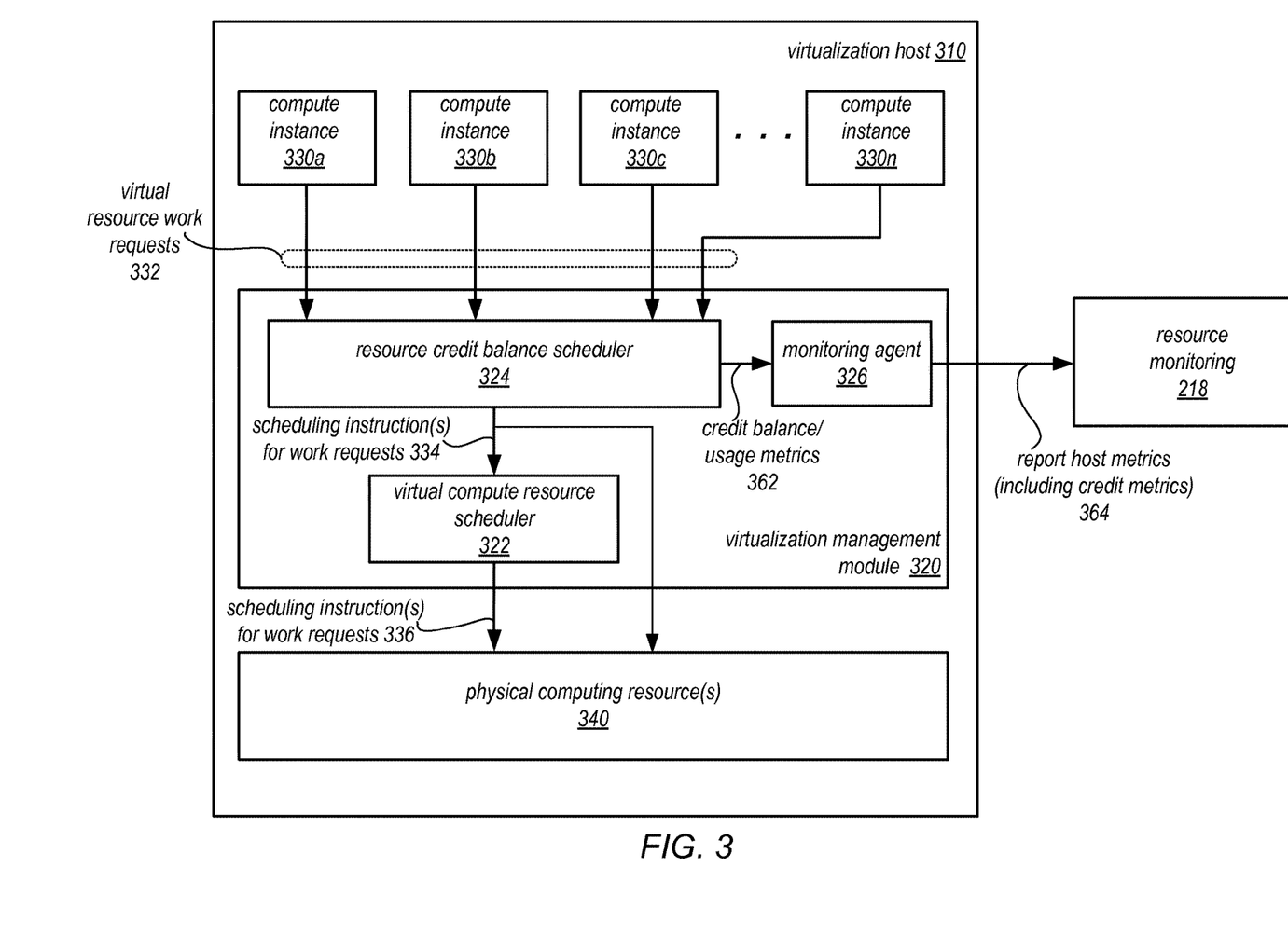
FIG. 3 is a block diagram illustrating a virtualization host that implements dynamic virtual resource request rate controls for physical resources, according to some embodiments.

FIG. 3 is a block diagram illustrating a virtualization host that implements dynamic virtual resource request rate controls for physical resources, according to some embodiments. As noted above in FIG. 2, virtualization hosts may serve as a host platform for one or more virtual compute instances. These virtual compute instances may utilize virtualized hardware interfaces to perform various tasks, functions, services and/or applications. As part of performing these tasks, virtual compute instances may utilize virtualized computer resources (e.g., virtual central processing unit(s) (vCPU(s)) which may act as the virtual proxy for the physical CPU(s)) implemented at the virtualization host in order to perform work on respective physical computer resources for the respective compute instance.

FIG. 3 illustrates virtualization host 310. Virtualization host 310 may host compute instances 330*a*, 330*b*, 330*c*, through 330*n*. In at least some embodiments, the compute instances 330 may be the same type of compute instance. In FIG. 3, compute instances 330 are compute instances that implement resource credits for scheduling virtual computer resources. Virtualization host 310 may also implement virtualization management module 320, which may handle the various interfaces between the virtual compute instances 330 and physical computing resource(s) 340 (e.g., various hardware components, processors, I/O devices, networking devices, etc.).

In FIG. 3, virtualization management module 320 may implement resource credit balance scheduler 324. Resource credit balance scheduler 324 may act as a meta-scheduler, managing, tracking, applying, deducting, and/or otherwise handling all resource credit balances for each of compute instances 330. In various embodiments resource credit balance scheduler 324 may be configured to receive virtual compute resource work requests 332 from computes instances. Each work request 332 may be directed toward the virtual computer resource corresponding to the compute instance that submitted the work. For each request 332, resource credit balance scheduler 324 may be configured to determine a current resource credit balance for the requesting compute instance 330, and generate scheduling instructions to apply resource credits when performing the work request. In some embodiments, resource credit balance scheduler 324 may perform or direct the performance of the scheduling instructions, directing or sending the work request to the underlying physical computing resources 340 to be performed. For example, in some embodiments different hardware queues may be implemented and resource credit balance scheduler 324 may be used to place tasks for performing work requests in the queues according to the applied resource credits, such as described below with regard to FIG. 4. However, in some embodiments the resource scheduling instructions may be sent 334 to virtual compute resource scheduler 322, which may be a scheduler for the physical resources 340, such as CPU(s), implemented at virtualization host 310. Resource credit balance scheduler 324 and/or virtual compute resource scheduler 322 may be configured to perform the various techniques described below with regard to FIGS. 5-6, in order to provide dynamic resource rate controls to scheduled/submit work requests for instances 330, apply resource credits, deduct resource credits, and/or otherwise ensure that work requests are performed according to the applied resource credits.

In some embodiments, in response to receiving the scheduling instructions, virtual compute resource scheduler 322 may provide physical scheduling instructions for work requests 336 to physical computing resources, such as physical CPU(s), in various embodiments. In at least some embodiments, virtual compute resource scheduler 322 may be a credit-based scheduler for one or more CPUs.

Resource credit balance scheduler 324 may also report credit balance and usage metrics 362 to monitoring agent 326, which may in turn report these metrics along with any other host metrics 364 (health information, etc.) to resource monitoring module 218.

Figure 4:
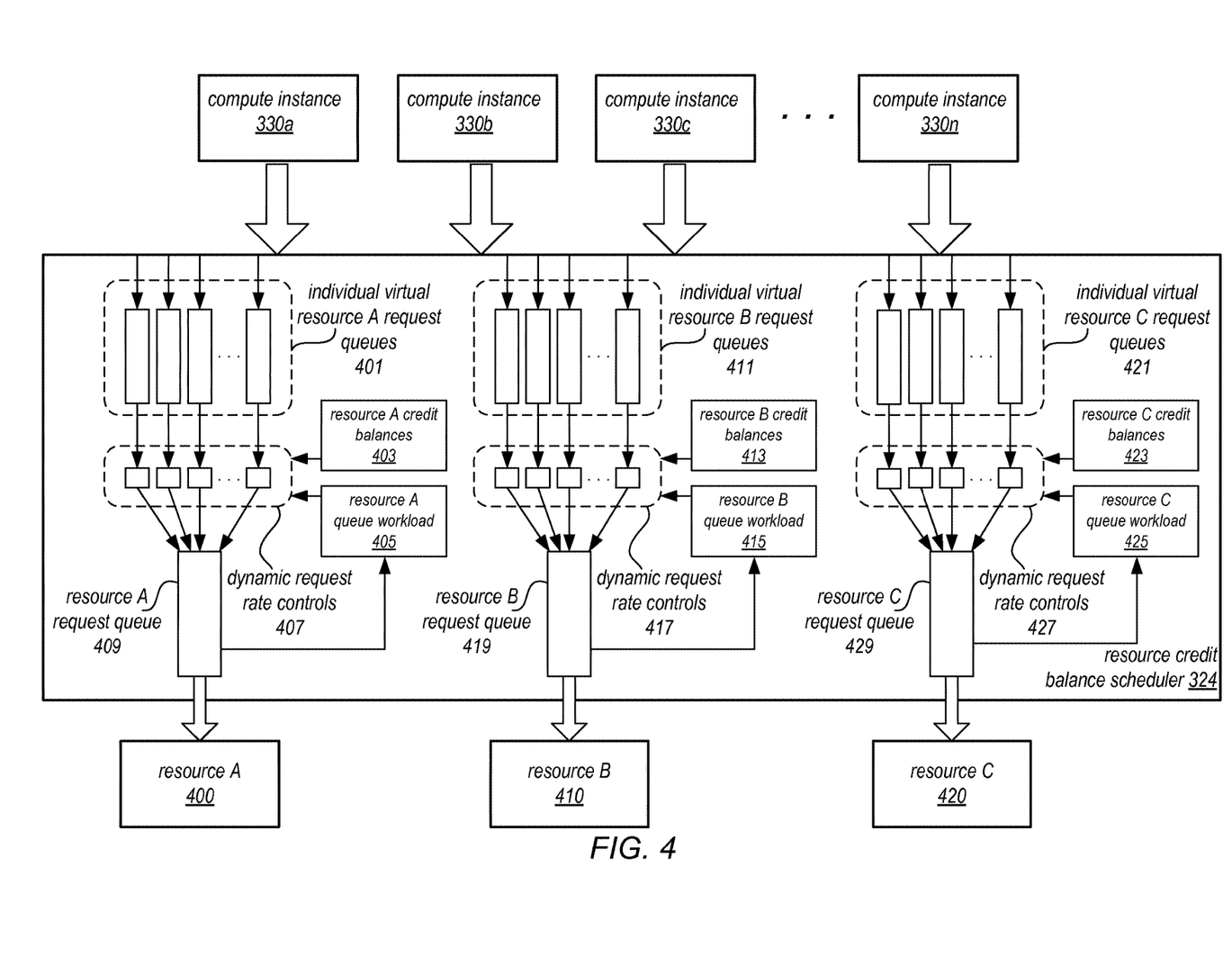
FIG. 4 is a block diagram illustrating a resource credit balance scheduler that implements dynamic virtual resource request rate controls, according to some embodiments.

FIG. 4 is a block diagram illustrating a resource credit balance scheduler that implements dynamic virtual resource request rate controls, according to some embodiments. As noted above, in various embodiments, resource credit balance scheduler 324 may implement dynamic virtual resource request rate controls for physical resources. Utilization of multiple different physical computer resources may be provided to compute instances 330. For example, resource A 400, resource B 410, and resource C 420 may represent processing, networking and/or storage physical computer resources (or any other physical computer resource). Different resource request queues may be implemented from which work requests may be pulled and performed. Resource A request queue 409 provides work requests to resource A 400. Similarly resource B request queue 419 and resource C request queue 429 provide requests to be pulled and performed for resource B 410 and resource C 420 respectively. In at least some embodiments, a resource request queue may be implemented as part of another scheduling component. For example, resource A 400 may be processing resources, and resource A request queue 409 may be implemented as part of a CPU scheduler that pulls requests from the request queue 409 for processing (similar to virtual compute resource scheduler 322 in FIG. 3).

Figure 5:
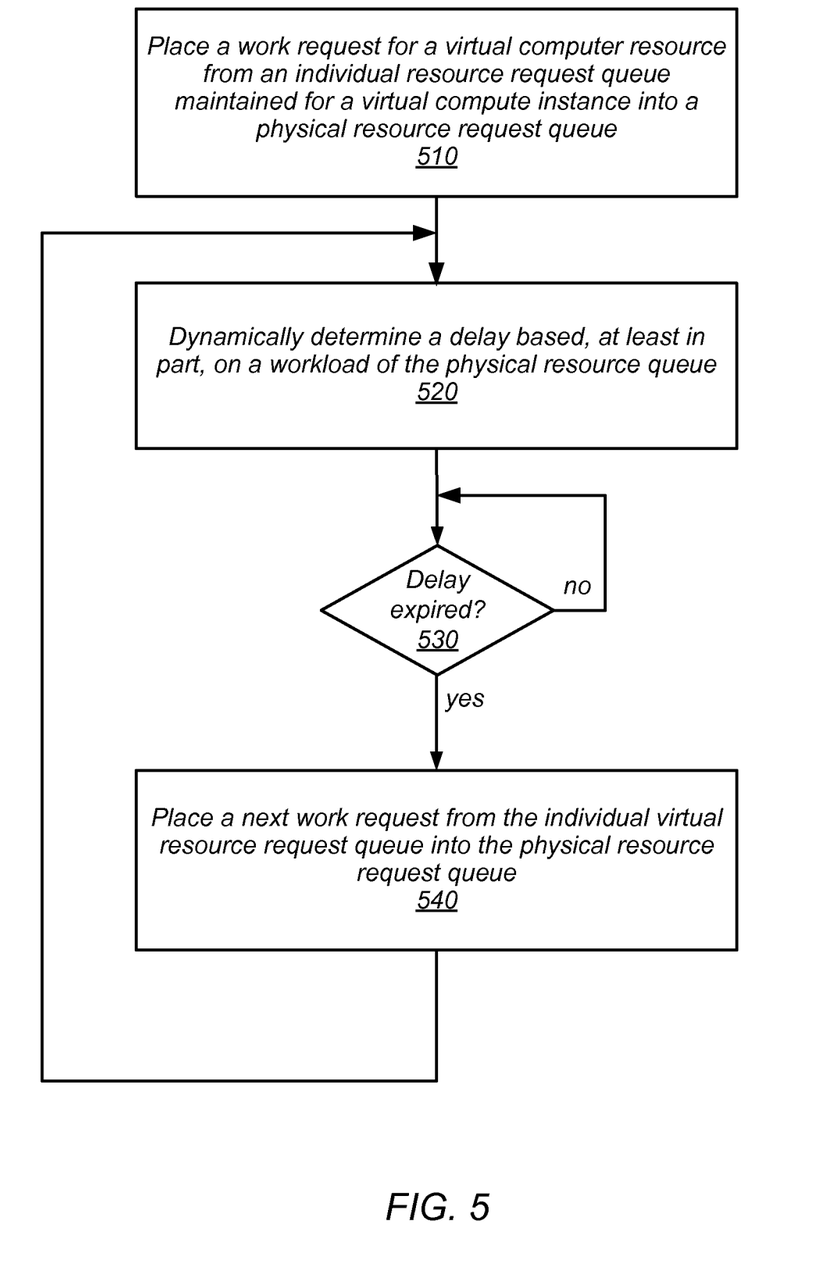
FIG. 5 is a high-level flowchart illustrating various methods and techniques for implementing dynamic virtual resource request rate control for physical resources, according to some embodiments.

Different dynamic request rate controls may be implemented for different resources, in some embodiments. For example dynamic request rate controls 407 may be implemented for work requests for resource A 400, dynamic request rate controls 417 may be implemented for work requests for resource B 410, and dynamic request rate controls 427 may be implemented for work requests for resource C 420. Dynamic resource request controls may be configured to dynamically determine a delay to be imposed before placing a next resource request into a resource request queue for the physical computer resource. FIGS. 5 and 6 described below provide various examples methods and techniques that dynamic rate controls may implement. For example, in at least some embodiments, a resource credit balance 403 of a particular instance (e.g., 330c) for resource A may be obtained to determine an initial delay between work requests (using the number of resource credits in the credit balance to identify an allotted utilization for instance 303c). The workload for resource A may also be obtained 405 and provided to the dynamic rate control. A probability for adding delay may be calculated using the workload for resource A, and depending on the probability calculated a delay may be randomly added or may not be added to the initial delay. The delay may then be imposed before the dynamic request rate control places another work request from the individual virtual resource A request queue 401 for instance 303c into resource A request queue 409. Similar techniques may be applied by dynamic request rate controls 417 and 427 for resources B 410 and C 420. A delay may be determined before placing new requests from individual virtual resource B request queues 411 and individual resource C request queues 421 utilizing resource B credit balances 413 and resource C credit balances 423 respectively. Resource B queue workload 415 and resource C queue workload 425 may also be used to dynamically determine the delay. Delays for individual virtual resource requests queues may be performed contemporaneously, in various embodiments. Thus, dynamic request rate controls 407 may be individual determining delays for the respective individual virtual resource A request queue 401 from which they pull work requests.

The examples of implementing dynamic virtual resource request rate controls for physical resources discussed above with regard to FIGS. 2-4 have been given in regard to virtual computing resources offered by a provider network. Various other types or configurations of virtualization hosts or other virtualization platforms may implement these techniques, which may or may not be offered as part of a network-based service. For example, other scheduling techniques different than a credit-based scheduling technique may be implemented to determine utilization of a physical computer resource. FIG. 5 is a high-level flowchart illustrating various methods and techniques for implementing dynamic virtual resource request rate control for physical resources, according to some embodiments. These techniques may be implemented using various components of network-based virtual computing service as described above with regard to FIGS. 2-4 or other virtual computing resource hosts.

As indicated at 510, a work request for a virtual computer resource may be placed from an individual resource request queue maintained for a virtual compute instance into a physical resource request queue, in various embodiments. In response to placing the work request in the physical resource request queue, a delay may be dynamically determined based, at least in part, on a workload of the physical request queue, as indicated at 520. For example, if the number of work requests in the physical resource request queue is high, then a greater probability exists that a random delay may be imposed. The delay may also be determined so as to maintain a particular utilization of the physical computer resource for the virtual compute instance. If, for example, a virtual compute instance is allotted 500 input/output operations per second (IOPs), then the delay may be determined such that 500 I/O work requests may be placed into the physical resource request queue between delays. FIG. 6, discussed below, provides further examples of dynamically determining a delay. After the delay is imposed, as indicated by the positive exit from 530, a next work request from the individual virtual resource request queue may be placed into the physical resource request queue, as indicated at 540.

The techniques described above with regard to FIG. 5 may be implemented across multiple individual virtual resource request queues for different virtual compute instances submitting work requests to utilize the same physical computer resource. For example, the various delays determined between requests may be different for some or all of the different individual virtual resource request queues. During a delay for one individual virtual resource queue, another work request may be submitted for another individual virtual resource queue, in some embodiments. Random delays may be added to requests from different individual virtual resource request queues at different times. Delays based on allotted utilization for the physical computer resource (e.g., based on a resource credit balance) may create different delay times as well. The aggregate effect provided by inserting dynamic delays between placing work requests at each individual virtual resource request queue may be to provide a consistent throughput for performing the work requests at the physical computer resource. Thus, work requests submitted by a virtual compute instance that is latency sensitive, for example, may be provided with a consistent amount of time or latency to perform the work request. Moreover delays may be determined to ensure that work requests submitted by a virtual compute instance that is throughput sensitive according to an expected amount of throughput.

FIG. 6 is high-level flowchart illustrating various methods and techniques for determining a delay for a dynamic resource rate control, according to some embodiments. As indicated at 610, an initial delay may be identified for an individual resource request queue of a virtual compute instance based, at least in part, on a determined utilization of a physical computer resource for the virtual compute instance. For instance, in some embodiments utilization of a physical computer resource may be evenly divided between the virtual compute instances implemented on a virtualization host. If, for example 4 compute instances are implemented on a host and processing resources of the host are evenly divided, then each virtual compute instance may expect a 25% utilization of the processing resources. In some embodiments, the determined utilization between virtual compute instances may be different and/or change over time. For instance, as discussed above with regard to FIGS. 2-4, resource credits may be accrued and applied for a virtual compute instance to utilize a physical computer resource. Thus, a determined utilization of a physical computer resource for the virtual compute instance may be, in such embodiments, based on a resource credit balance for the virtual compute instance for the physical computer resource. The initial delay may be determined such as to ensure that the allotted utilization is not exceeded by a virtual compute instance. If, for instance, a virtual compute instance has a determined utilization for network traffic at 1000 packets per second, then the initial delay if inserted between submitting traffic requests for a second would limit the number of requests to a maximum of 1000 packets.

As indicated at 620, a workload of the physical resource request queue for the physical computer resource may be determined, in various embodiments. Workload metrics for a physical resource request queue may be tracked indicating the number of requests in the queue at a point in time, for example. In some embodiments, the workload requests metrics may be smoothed to determine a workload. For instance, a weighted average may be taken of the workload metrics. In some embodiments, the same workload may be used for determining multiple different delays. For example, the workload for determining a first delay may be 100 requests, and the same workload of 100 requests may be used again to determine a subsequent delay.

In at least some embodiments, a probability for adding a random delay may be calculated based, at least in part, on the work load of the physical resource request queue. For example, a probability calculation such as may be determined when applying a Random Early Detection (RED) technique may be used to calculate the probability for the delay. Various different random number generation techniques, such as a uniform random variable technique or a geometric random variable technique may be applied as part of calculating the probability. In general, the calculated probability may be proportional to the offered load divided by the available throughput at the physical resource request queue. As the workload of the physical resource request queue increases, the probability or likelihood that a delay may be randomly added increases.

As indicated at 640, whether a random delay is added to the initial delay is determined according to the calculated probability at 630. If, the probability indicates that for every $1/10$ work requests submitted a random delay may be added, then the initial delay has a $1/10$ to be increased with an additional delay, for example. The amount of time added in the random delay may be a default amount of time, or may be determined to achieve a particular throughput or workload at the physical resource request queue, in some embodiments. Thus, as indicated at 650 and 660, either the random delay will be added to the initial delay or not added to the initial delay according to the determined probability.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 7:
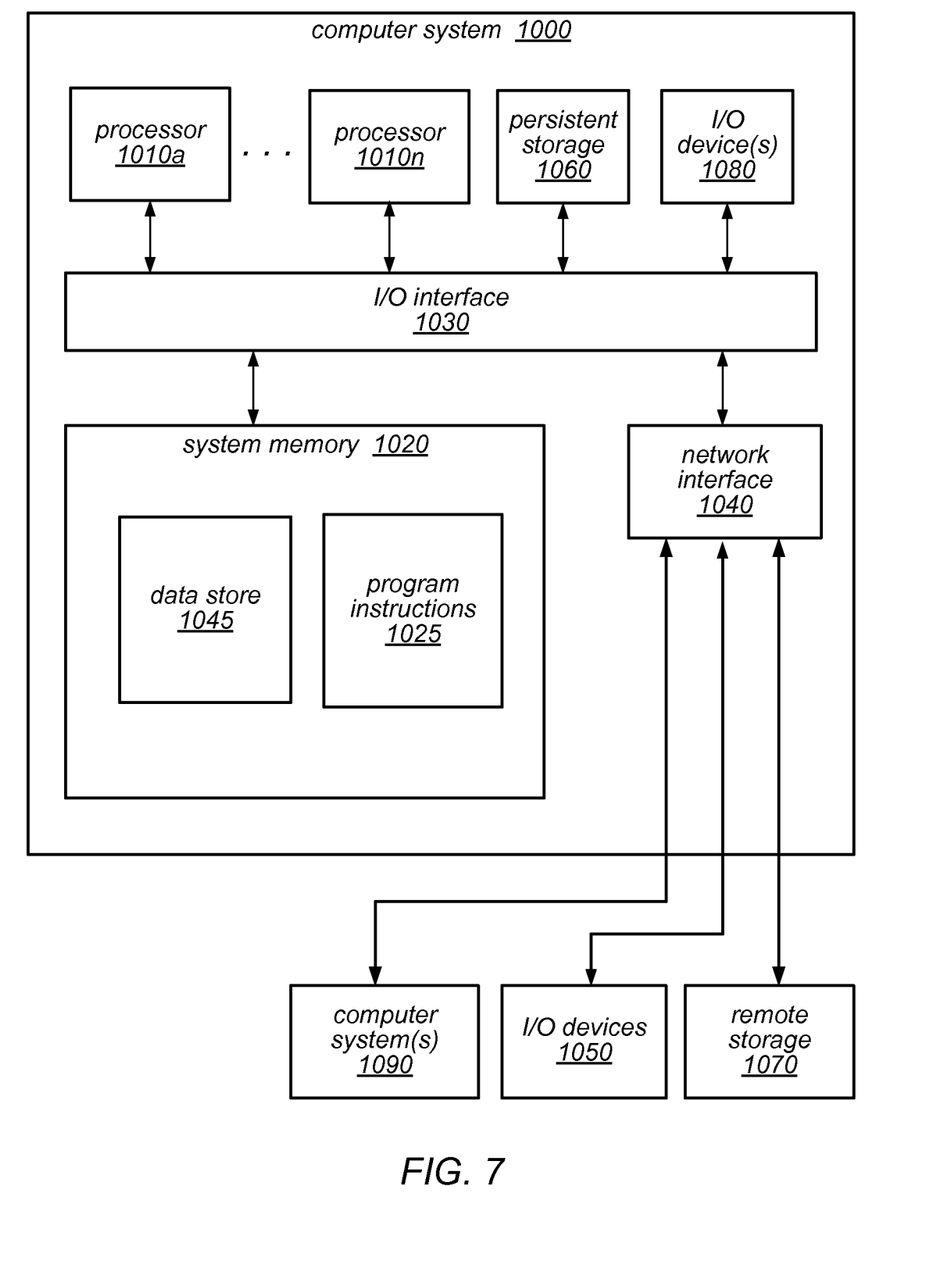
FIG. 7 is a block diagram illustrating an example computing system, according to some embodiments.

Embodiments of dynamic virtual resource request rate task controls for physical resources as described herein may be executed on one or more computer systems, which may interact with various other devices. FIG. 7 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the provider network described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a provider network and/or virtualization host, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more components of the distributed system described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 7 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor;
   a memory, comprising program instructions that when executed by the at least one processor cause the at least one processor to implement a virtualization host for a plurality of virtual compute instances;
   wherein the virtualization host is configured to:
      maintain a plurality of individual virtual resource request queues for respective virtual computer resources of the plurality of virtual compute instances that utilize a physical computer resource;
      implement a dynamic rate control for individual ones of the plurality of individual virtual resource request queues;
      the dynamic rate control, configured to:
         place a work request for a virtual computer resource of a virtual compute instance from an individual virtual resource request queue into a physical resource request queue to perform the work request at the physical computer resource;
         in response to the placement of the work request:
            dynamically determine a delay based, at least in part, on a workload of the physical resource request queue; and
            after imposition of the delay, place a next work request from the individual virtual resource request queue into the physical resource request queue;
         wherein a work request from at least one other individual virtual resource request queue of the plurality of individual virtual resource request queues is placed in the physical resource request queue during the delay.

2. The system of claim 1, wherein, to dynamically determine the delay, the dynamic rate control is configured to:
   identify an initial delay for the individual virtual resource request queue based, at least in part, on a determined utilization of the physical computer resource for the virtual compute instance;
   calculate a probability for adding a random delay based, at least in part, on the workload of the physical resource request queue; and
   add the random delay to the initial delay according to the calculated probability.

3. The system of claim 2, wherein the determined utilization of the physical computer resource for the virtual compute instance is based, at least in part, on a resource credit balance for the physical resource maintained for the virtual compute instance.

4. The system of claim 1, wherein the virtualization host is implemented as part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

5. A method, comprising:
   performing, by one or more computing devices that together implement a virtualization host for a plurality of virtual compute instances:
      placing a work request for a virtual computer resource from an individual virtual resource request queue maintained for a virtual compute instance into a physical resource request queue to perform the work request at a physical computer resource, wherein the virtual compute instance is one of the plurality virtual compute instances, wherein the individual virtual resource request queue is one of a plurality of respective individual virtual resource request queues for respective virtual computer resources including the virtual computer resource of the plurality of virtual compute instances;
      in response to placing the work request:
         dynamically determining a delay based, at least in part, on a workload of the physical resource request queue; and
         after imposing the delay, placing a next work request from the individual virtual resource request queue into the physical resource request queue;
      wherein a work request from at least one other individual virtual resource request queue of the plurality of individual virtual resource request queues is placed in the physical resource request queue during the delay.

6. The method of claim 5, wherein dynamically determining the delay comprises:
identifying an initial delay for the individual virtual resource request queue based, at least in part, on a determined utilization of the physical computer resource for the virtual compute instance;
calculating a probability for adding a random delay based, at least in part, on the workload of the physical resource request queue; and
adding the random delay to the initial delay according to the calculated probability.

7. The method of claim 6, wherein the determined utilization of the physical computer resource for the virtual compute instance is based, at least in part, on a resource credit balance for the physical resource maintained for the virtual compute instance.

8. The method of claim 6, wherein determining the workload of the physical resource request queue comprises smoothing one or more workload metrics indicating workload of the physical resource request queue at different points in time.

9. The method of claim 6, further comprising:
in response to placing the next work request into the physical resource request queue:
performing dynamically determining the delay, wherein according to the calculated probability the random delay is not added to the initial delay; and
imposing the initial delay prior to placing another work request from the individual virtual resource request queue into the physical resource request queue.

10. The method of claim 5, wherein placing the work request, dynamically determining the delay, and placing the next work request are performed for other individual virtual resource request queues for different virtual computer resources of the plurality of virtual compute instances that correspond to different physical computer resources.

11. The method of claim 5, wherein the different physical computer resources comprise:
processing resources;
networking resources; or
storage resources.

12. The method of claim 5, wherein a determined utilization of the physical computer resource for the virtual compute instance is higher than a determined utilization of the physical computer resource for a virtual compute instance for which the work request from the at least one other individual virtual resource request queue is placed in the physical resource request queue during the delay.

13. The method of claim 5, wherein the virtualization host is implemented as part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

14. A non-transitory computer-readable storage medium, storing program instructions that when executed by one or more computing devices cause the one or more computing devices to implement a virtualization host for a plurality of compute instances, wherein the virtualization host implements:

placing a work request for a virtual computer resource from an individual virtual resource request queue maintained for a virtual compute instance into a physical resource request queue to perform the work request at a physical computer resource, wherein the virtual compute instance is one of the plurality virtual compute instances, wherein the individual virtual resource request queue is one of a plurality of respective individual virtual resource request queues for respective virtual computer resources including the virtual computer resource of the plurality of virtual compute instances;
in response to placing the work request:
dynamically determining a delay based, at least in part, on a workload of the physical resource request queue; and
after imposing the delay, placing a next work request from the individual virtual resource request queue into the physical resource request queue;
wherein a work request from at least one other individual virtual resource request queue of the plurality of individual virtual resource request queues is placed in the physical resource request queue during the delay.

15. The non-transitory computer-readable storage medium of claim 14, wherein, in dynamically determining the delay, the program instructions cause the virtualization host to further implement:
identifying an initial delay for the individual virtual resource request queue based, at least in part, on a determined utilization of the physical computer resource for the virtual compute instance;
calculating a probability for adding a random delay based, at least in part, on the workload of the physical resource request queue; and
adding the random delay to the initial delay according to the calculated probability.

16. The non-transitory computer-readable storage medium of claim 15, wherein the determined utilization of the physical computer resource for the virtual compute instance is based, at least in part, on a resource credit balance for the physical resource maintained for the virtual compute instance.

17. The non-transitory computer-readable storage medium of claim 15, wherein determining the workload of the physical resource request queue comprises smoothing one or more workload metrics indicating workload of the physical resource request queue at different points in time.

18. The non-transitory computer-readable storage medium of claim 14, wherein the program instructions cause the virtualization host to further implement:
in response to placing the next work request into the physical resource request queue:
performing dynamically determining the delay, wherein according to the calculated probability the random delay is not added to the initial delay; and
imposing the initial delay prior to placing another work request from the individual virtual resource request queue into the physical resource request queue.

19. The non-transitory computer-readable storage medium of claim 14, wherein a determined utilization of the physical computer resource for the virtual compute instance is lower than a determined utilization of the physical computer resource for a virtual compute instance for which the work request from the at least one other individual virtual resource request queue is placed in the physical resource request queue during the delay.

20. The non-transitory computer-readable storage medium of claim 14, wherein the virtualization host is implemented as part of a provider network that offers a network-based virtual computing service, wherein the virtualization host is multi-tenant such that at least one of the plurality of virtual compute instances implemented at the virtualization host is maintained for a client of the provider network that is different than another client of the provider network maintaining another one of the plurality of virtual compute instances at the virtualization host.

* * * * *